United States Patent [19]

Egli

[11] Patent Number: 4,505,857
[45] Date of Patent: Mar. 19, 1985

[54] AZO COMPOUNDS HAVING A 5-SUBSTITUTED-4-CHLOROTHIAZOLYL-2-DIAZO COMPONENT RADICAL

[75] Inventor: Robert Egli, Rheinfelden, Switzerland

[73] Assignee: Sandoz Ltd., Basel, Switzerland

[21] Appl. No.: 242,506

[22] Filed: Mar. 10, 1981

[30] Foreign Application Priority Data

Mar. 13, 1980 [CH] Switzerland .................. 1981/80

[51] Int. Cl.³ .................. C09B 29/042; C09B 29/09; C09B 29/095; D06P 1/18
[52] U.S. Cl. .................. 534/768; 548/164; 534/765; 534/766; 534/769; 534/774; 534/775; 534/776; 534/778; 534/794; 534/795
[58] Field of Search .......... 260/158, 155, 156, 157, 260/152

[56] References Cited

U.S. PATENT DOCUMENTS

| | | | |
|---|---|---|---|
| 3,639,385 | 2/1972 | Weaver et al. | 260/158 |
| 3,829,410 | 8/1974 | Fisher et al. | 260/158 |
| 4,111,930 | 9/1978 | Meyberk | 260/158 |
| 4,219,475 | 8/1980 | Frishberg | 260/158 |
| 4,255,326 | 3/1981 | Giles et al. | 260/152 |
| 4,259,236 | 3/1981 | Koller et al. | 260/156 |

FOREIGN PATENT DOCUMENTS

| | | | |
|---|---|---|---|
| 2729914 | 1/1978 | Fed. Rep. of Germany | 260/158 |
| 2046800 | 3/1971 | France | 260/158 |
| 1379233 | 1/1975 | United Kingdom | 260/158 |

*Primary Examiner*—Floyd D. Higel
*Attorney, Agent, or Firm*—Gerald D. Sharkin; Richard E. Vila; Melvyn M. Kassenoff

[57] ABSTRACT

Compounds of the formula

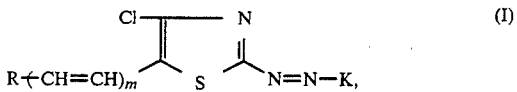

in which
K is the radical of a coupling component of the aniline, α-naphthylamine, pyrazolone, aminopyrazole, indole, tetrahydroquinoline, thiazole, phenol, naphthol, pyridine or pyridone series.

R is —CHO, —CH=C(CN)—$R_1$, —CH=CH—$R_2$, —CH=C($NO_2$)—$R_3$, —CH=NOH or —CN, wherein $R_1$ is ($C_{1-10}$alkoxycarbonyl; ($C_{1-10}$alkoxy)-carbonyl monosubstituted by chloro, bromo, cyano, hydroxy, $C_{1-2}$alkoxy, ($C_{1-2}$alkyl)carbonyloxy or ($C_{1-2}$alkoxy)carbonyl; ($C_{1-10}$alkoxy)carbonyl disubstituted by hydroxy and by chloro or bromo; ($C_{3-8}$alkenyl)oxycarbonyl; ($C_{3-8}$chloroalkenyl)oxycarbonyl; ($C_{3-8}$bromoalkenyl)oxycarbonyl; propynyloxycarbonyl; benzyloxycarbonyl; chlorobenzyloxycarbonyl; nitrobenzyloxycarbonyl; $C_{1-4}$alkylsulfonyl; phenylsulfonyl; tolylsulfonyl; carbamoyl; ($C_{1-2}$alkyl)carbamoyl; di($C_{1-2}$alkyl)carbamoyl; phenylcarbamoyl; aminothiocarbonyl; benzimidazolyl-2; cyano; acetyl; phenyl; benzoyl or phenyl or benzoyl substituted by 1, 2 or 3 substituents each of which is independently chloro, bromo or nitro, with the proviso that the maximum number of nitro groups is two, and $R_2$ is phenyl; benzoyl or phenyl or benzoyl substituted by 1, 2 or 3 substituents each of which is independently chloro, bromo or nitro, with the proviso that the maximum number of nitro groups is two, and $R_3$ is hydrogen, methyl or ethyl, and m is 0 or 1, useful as disperse dyes for dyeing and printing textile substrates comprising or consisting of synthetic or semi-synthetic, hydrophobic, high molecular weight, organic materials such as linear aromatic polyesters, cellulose 2½ acetate, cellulose triacetate and synthetic polyamides, with those wherein R is formyl also being useful for dyeing wool.

17 Claims, No Drawings

AZO COMPOUNDS HAVING A 5-SUBSTITUTED-4-CHLOROTHIAZOLYL-2-DIAZO COMPONENT RADICAL

The present invention relates to substituted 4-chlorothiazolyl group-containing compounds, their production and use as dyestuffs.

More particularly, the present invention provides disperse dyestuffs of formula I,

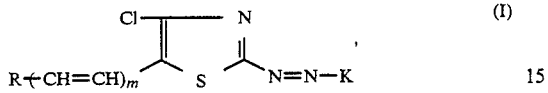

in which
- K is the radical of a coupling component of the aniline, α-naphthylamine, pyrazolone, aminopyrazole, indole, tetrahydroquinoline, thiazole, phenol, naphthol, pyridine or pyridone series,
- R is —CHO, —CH=C(CN)—$R_1$, —CN, —CH=CH—$R_2$, —CH=NOH or —CH=C($R_3$)$NO_2$,
- $R_1$ is $C_{1-10}$ alkoxycarbonyl optionally monosubstituted by chlorine, bromine, cyano, hydroxyl, $C_{1-2}$alkoxy, $C_{1-2}$-alkylcarbonyloxy or $C_{1-2}$alkoxycarbonyl; $C_{1-10}$alkoxycarbonyl disubstituted by a hydroxy group and a chlorine or bromine atom; $C_{3-8}$alkenyloxycarbonyl; chloro- or bromo-($C_{3-8}$-alkenyl)oxycarbonyl; propynyloxycarbonyl; benzyl-, chlorobenzyl- or nitrobenzyloxycarbonyl; $C_{1-4}$alkylsulphonyl; phenyl or benzyl optionally substituted by a total of up to three substituents selected from chlorine, bromine and nitro (max. 2 nitro groups); phenylsulphonyl; tolylsulphonyl; aminocarbonyl; mono- or di($C_{1-2}$alkyl)aminocarbonyl; phenylaminocarbonyl; aminothiocarbonyl; benzimidazolyl-2; cyano; or acetyl;
- $R_2$ is phenyl or benzoyl optionally substituted by a total of up to three substituents selected from chlorine, bromine and nitro (max. 2 nitro groups);
- $R_3$ is hydrogen, methyl or ethyl, and m
is 0 or 1.

Preferred compounds of formula I are those in which the coupling component is of the aniline, pyrazole or tetrahydroquinoline series, especially the aniline series.

Preferably K is K' where K' is a radical of formula

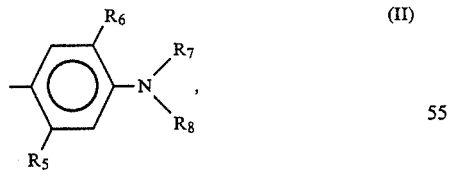

in which
- $R_5$ is hydrogen; $C_{1-2}$alkyl; $C_{1-2}$alkoxy; cyano; formylamino; alkylcarbonylamino in which the alkyl moiety is optionally monosubstituted by hydroxyl, chlorine, bromine, alkoxy, phenyl, phenoxy, benzyloxy or ($C_{1-2}$alkoxy)carbonyl; benzoylamino; acryloylamino; allylcarbonylamino; aminocarbonylamino; alkylaminocarbonylamino; alkoxycarbonylamino in which the alkoxy moiety is optionally monosubstituted by $C_{1-2}$alkoxy or phenyl; $C_{1-2}$alkyl- or phenylsulphonylamino; di-$C_{1-2}$alkylaminosulphonylamino; chlorine or bromine;
- $R_6$ is hydrogen, chlorine, bromine, $C_{1-2}$-alkyl, $C_{1-2}$alkoxy, $C_{1-2}$alkoxyethoxy, with the proviso that only one of $R_5$ and $R_6$ can signify chlorine or bromine;

either
- $R_7$ is hydrogen; $C_{1-8}$alkyl; $C_{1-4}$alkyl substituted by up to two substituents selected from chlorine, bromine, hydroxyl, thiocyano, cyano, alkylcarbonyl, alkoxycarbonyl, formyloxy, ($C_{1-10}$alkyl)carbonyloxy, cyclohexyl, chloro- or bromo-($C_{1-3}$ alkyl)carbonyloxy, ($C_{1-10}$alkoxy)carbonyloxy, $C_{1-2}$alkoxyethoxycarbonyloxy, alkenyloxycarbonyl, chloro- or bromoallyloxycarbonyl, alkenyloxy, chloro- or bromoallyloxy, propynyloxy, benzoyloxy, alkoxy, phenyl, phenoxy and phenylalkoxy, with the proviso that such substituted alkyl bears no more than one aryl-containing group; alkoxyalkyl in which the alkoxy moiety is monosubstituted by chlorine, bromine, cyano, alkoxy, alkoxycarbonyl, alkoxycarbonyloxy or alkylcarbonyloxy; β-alkyl-; alkenyl optionally monosubstituted by phenyl, chlorine or bromine; propynyl; $C_{5-7}$cycloalkyl; cyclohexyl substituted by one, two or three methyl groups; phenyl optionally substituted by a total of up to three substituents selected from chlorine, bromine, methyl and $C_{1-2}$alkoxy, or
- $R_7$ together with $R_8$ forms a piperidine or morpholine ring,
- $R_8$ is hydrogen; $C_{1-8}$alkyl; $C_{1-4}$alkyl, monosubstituted by chlorine, bromine, hydroxyl, cyano, thiocyano, alkylcarbonyl, alkoxycarbonyl, formyloxy, alkylcarbonyloxy, chloro- or bromoalkylcarbonyloxy, alkoxycarbonyloxy, $C_{1-2}$alkoxyethoxycarbonyloxy, alkenyloxycarbonyl, chloro- or bromoallyloxycarbonyl, alkenyloxy, chloro- or bromoallyloxy, propynyloxy, benzyloxy, alkoxy, phenyl, phenoxy, phenylalkoxy, aminocarbonyl, alkyl- or dialkylaminocarbonyl, alkyl- or dialkylaminocarbonyloxy, phenylaminocarbonyl, phenylaminocarbonyloxy, phthalimidyl-2, succinimidyl-2, saccharinyl-2, pyridyl or benzothiazolyl-2-mercapto; alkoxyalkyl in which the alkoxy moiety is monosubstituted by chlorine, bromine, cyano, alkoxy, alkoxycarbonyl, alkoxycarbonyloxy or alkylcarbonyloxy; β-hydroxy-, β-alkylcarbonyloxy or β-alkenylcarbonyloxy-γ-allyloxy or γ-propynyloxypropyl; alkenyl optionally monosubstituted by chlorine, bromine or phenyl or,
- $R_8$ together with $R_7$ form a heterocyclic ring as given above, any alkyl and alkoxy radicals or moieties, unless otherwise specified, contain 1 to 4 carbon atoms and any alkenyl radicals or moieties contain 3 or 4 carbon atoms , or K' is the radical of a coupling component of the pyrazole or tetrahydroquinoline series.

More preferably K is K'', where K'' is a coupling component radical of formula VI

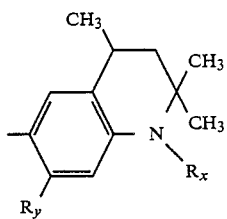

in which
R$_x$ is hydroxyethyl, methyl, ethyl, methoxycarbonylethyl, ethoxycarbonylethyl, benzyl, methoxyethyl, ethoxyethyl or acetoxyethyl, and
R$_y$ is hydrogen, methyl or acetylamino,
or a radical of formula II.

Even more preferably K is K''', where K''' is a radical of formula II.

R$_5$ is preferably R$_5$', where R$_5$' is hydrogen, methyl or —NHCOR$_9$, where R$_9$ is hydrogen, C$_{1-4}$alkoxy, C$_{1-2}$-alkoxyethoxy or C$_{1-2}$alkyl optionally monosubstituted by chlorine, bromine or C$_{1-2}$alkoxy.

Most preferably R$_5$ is hydrogen or methyl.

R$_6$ is preferably R$_6$', where R$_6$' is hydrogen, methyl, methoxy, ethoxy or C$_{1-2}$ alkoxyethoxy.

Most preferably R$_6$ is hydrogen.

Preferably R$_7$ and R$_8$ have a significance other than forming a heterocyclic ring.

Among the preferred significances of R$_7$, when it is a disubstituted alkyl group, are β-hydroxy or (C$_{1-4}$alkyl)-carbonyloxy-γ-allyloxy or propynyloxy-propyl.

R$_7$ is preferably R$_7$', where R$_7$' is hydrogen, C$_{3-4}$alkenyl, C$_{1-6}$alkyl or C$_{2-3}$alkyl monosubstituted by hydroxy, allyloxy, propynyloxy, cyano, (C$_{1-4}$-alkoxy)carbonyl or (C$_{3-4}$alkenyl)oxycarbonyl or substituted by up to two substituents selected from C$_{1-3}$alkoxy, (C$_{2-3}$alkyl)carbonyloxy and (C$_{1-3}$alkoxy)carbonyloxy.

Most preferably R$_7$ is (C$_{1-4}$)alkyl

R$_8$ is preferably R$_8$', where R$_8$' is C$_{1-4}$alkyl, benzyl, phenylethyl or C$_{2-3}$alkyl monosubstituted by hydroxy, C$_{1-3}$alkoxy, allyloxy, propynyloxy, cyano, (C$_{1-3}$alkyl)carbonyloxy, (C$_{1-4}$alkoxy)carbonyl, (C$_{3-4}$alkenyl) oxycarbonyl, (C$_{2-3}$alkoxy)carbonyloxy or phenoxy.

Most preferably R$_8$ is (C$_{1-4}$alkyl).

Most preferably K is K$^{iv}$, where K$^{iv}$ is a radical of formula II wherein R$_5$ is R$_5$', R$_6$ is R$_6$', R$_7$ is R$_7$' and R$_8$ is R$_8$'.

It will be appreciated that the substituents are chosen such that the molecule is free from groupings such as groupings such as —O—C(—O)— (acetal) and —N—C(—O)—.

R$_1$ is preferably R$_1$', where R$_1$' is (C$_{3-6}$alkoxy) carbonyl or (C$_{3-6}$alkenyl)oxycarbonyl.

Any phenyl or benzoyl as R$_2$ which is substituted is preferably monosubstituted.

R$_3$ is preferably hydrogen.

m is preferably 0.

R is preferably R', where R' is —CHO, —CH=C(CN)R$_1$ or —CH=CR$_3$—NO$_2$.

More preferably R is R'', where R'' is —CHO, —CH=C(CN)R$_1$' or —CH=CHNO$_2$.

Most preferably R is R''', where R''' is —CHO or —CH=C(CN)—R$_1$'.

Preferred compounds of formula I are
(1) those wherein K is K', more preferably K'';
(2) those wherein K is K''', especially those wherein R is R' more preferably R'';
(3) those wherein K is K$^{iv}$ and R is R'';
(4) those of (1), (2) or (3) wherein m is 0;
(5) those of (2), (3) or (4) wherein R is R''';
(6) those of (3) wherein R$_5$ is hydrogen or methyl, R$_6$ is hydrogen, R$_7$ and R$_8$ are both ethyl, m is 0 and R is R'''.

The present invention further provides a process for the production of a compound of formula I, comprising coupling a diazotized amine of formula III,

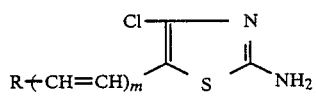

with a compound of formula IV,

H—K     (IV)

Diazotization and coupling are carried out in accordance with known methods. Compounds of formula I in which R is formyl may be converted to other compounds of formula I by reacting the formyl compounds with the corresponding active methylene compound.

The compounds of formula III wherein R is formyl may be prepared by reacting the compound of formula V

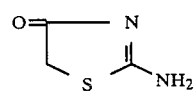

or a salt thereof, with a Vilsmeier reagent, e.g. the reaction product of phosphorus oxychloride and dimethylformamide, and the resulting product of formula IIIa

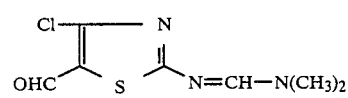

is hydrolysed to the 2-amino compound by heating in an acid or basic medium.

The compounds of formula III wherein m is 1 may be formed by reacting compounds of formula V with vinylic Vilsmeier reagents, followed by hydrolysis. Vinylic Vilsmeier reagents may be obtained, for example, by reacting phosphorus-oxychloride with (CH$_3$)$_2$—NCH=CH—CHO.

Further, the compounds of formula I or III wherein R is formyl may be converted into other compounds of Formula I or III by known methods, for example condensation with hydroxylamine and optionally acylating the oxygen with nitrile formation; preparation of Schiff's bases, Knoevenagel, Perkin or Wittig-Horner reactions; aldol additions etc.

The disperse dyestuffs of formula I may be used for dyeing or printing, from aqueous dispersion, textile substrates consisting of or comprising synthetic or semi-synthetic, hydrophobic, high molecular weight organic materials. Preferred textile substrates are those which consist of or comprise linear, aromatic polyesters, cellulose 2½ acetate, cellulose triacetate and synthetic polyamides.

The compounds of formula I may be made up into dyeing preparations in known manner by grinding in the presence of dispersing agents and/or fillers optionally with vacuum or spray drying. After the addition of water the preparations may be used in the so-called long or short dyebaths. Dyeing and printing may be carried out in accordance with known methods.

The dyeings obtained have notable light-, thermofixation-, sublimation- and pleating-fastness.

The compounds of formula I wherein R is formyl are also useful for dyeing wool.

The following Examples further serve to illustrate the invention. In the Examples all parts are by weight and all temperatures are in degrees Centigrade.

EXAMPLE 1

To 73 parts N,N-dimethylformamide at 0° to 5° are added dropwise, 46 parts phosphorus-oxychloride. 15.2 parts 2-aminothiazolin-4-one-hydrochloride are added portionwise at 0° to 5° to the colourless solution of the Vilsmeier complex. The cooling bath is removed and the mixture is heated to 70°. After 14 hours stirring the solution is allowed to cool and is added carefully to a mixture of 41 parts sodium acetate, 60 parts water and 50 parts ice. The brown-red solution is stirred at 50° for 2 hours whereby the 2-amino-4-chloro-5-formylthiazole formed by hydrolysis precipitates successively. The yellow product is filtered after cooling to room temperature.

16.25 Parts product are added without further purification in small portions to a mixture of nitrosylsulphuric acid (obtained by heating a solution of 6.9 parts sodium nitrite in 140 parts sulphuric acid at 70°) in 100 parts phosphoric acid cooled to 0°. The mixture is stirred for 1 hour whilst being maintained at 0°. The resulting diazonium salt solution is added over a period of 30 minutes to a mixture of 32.2 parts 3-[N-cyanoethyl-N-(γ-chloroallyl)-amino]-4-ethoxyacetanilide, 5 parts amidosulphonic acid and 500 parts 5% aqueous sulphuric acid. The dyestuff suspension is stirred for 1 hour at 0°, filtered, washed free of acid and salt and dried.

The dyestuff obtained, of formula

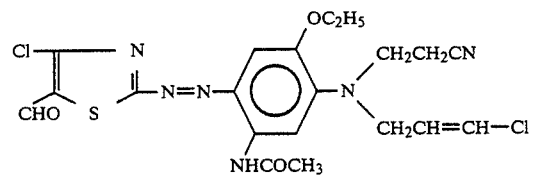

dyes linear, aromatic polyester or cellulose acetate in brilliant blue shades with good fastness.

In the following Table further dyestuffs which are made in analogy with the procedure given above are given. They correspond to the general formula

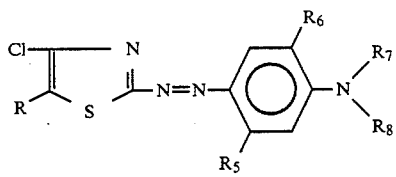

TABLE 1

| Ex. No. | R | $R_6$ | $R_5$ | $R_7$ | $R_8$ | Shade on polyester fibres |
|---|---|---|---|---|---|---|
| 2 | —CHO | —OC$_2$H$_5$ | —NHCOCH$_3$ | —C$_2$H$_5$ | —C$_2$H$_5$ | blue |
| 3 | " | " | —NHCOC$_2$H$_5$ | —CH$_2$CH$_2$OCOC$_2$H$_5$ | —CH$_2$CH$_2$OCOC$_2$H$_5$ | " |
| 4 | " | " | —NHCOCH$_3$ | —CH$_2$CH$_2$OCOOC$_2$H$_5$ | —CH$_2$CH$_2$OCOOC$_2$H$_5$ | " |
| 5 | " | —OCH$_3$ | " | —CH$_2$CH$_2$OCOCH$_3$ | —CH$_2$CH$_2$OCOCH$_3$ | " |
| 6 | " | " | —NHCOCH$_3$ | —CH$_2$CH$_2$OCH$_3$ | —CH$_2$CH$_2$OCH$_3$ | " |
| 7 | " | " | —NHCOCH$_3$ | —CH$_2$CH$_2$OCH$_2$CH=CH$_2$ | —CH$_2$CH$_2$OCH$_2$CH=CH$_2$ | " |
| 8 | " | —OC$_2$H$_5$ | " | —CH$_2$CH$_2$OCH$_2$C$_6$H$_5$ | —CH$_2$CH$_2$OCH$_2$C$_6$H$_5$ | " |
| 9 | " | " | —NHCOCH$_2$Cl | —CH$_2$CH$_2$OCH$_2$C=CH | —CH$_2$CH$_2$OCH$_2$C=CH | " |
| 10 | " | —OCH$_3$ | —NHCOCH$_2$CH$_2$OCH$_3$ | —C$_2$H$_5$ | —C$_2$H$_5$ | " |
| 11 | " | " | —NHSO$_2$CH$_3$ | —n-C$_4$H$_9$ | n-C$_4$H$_9$ | " |
| 12 | " | " | —NHCONH$_2$ | —CH$_2$CH=CHCl | —CH$_2$CH=CHCl | " |
| 13 | " | " | —NHCONH$_2$ | —CH$_2$CH$_2$OCH$_2$CH=CH$_2$ | —CH$_2$CH$_2$OCH$_2$CH=CH$_2$ | " |
| 14 | " | " | —NHCOCHClCH$_3$ | —C$_2$H$_5$ | —C$_2$H$_5$ | " |
| 15 | " | " | —NHCOOCH$_2$CH$_2$OC$_2$H$_5$ | " | " | " |
| 16 | " | " | —CH$_3$ | —CH$_2$CH$_2$OCH$_2$CH=CH$_2$ | —CH$_2$CH$_2$OCH$_2$CH=CH$_2$ | " |
| 17 | " | " | " | —n-C$_4$H$_9$ | —N—C$_4$H$_9$ | " |
| 18 | " | " | " | —CH$_2$CH$_2$C$_6$H$_5$ | —CH$_2$CH$_2$OH | " |
| 19 | " | " | " | —CH$_2$CH$_2$OC$_2$H$_5$ | —CH$_2$CH$_2$OC$_2$H$_5$ | " |
| 20 | " | " | " | —CH$_2$CH$_2$NCOCH$_2$CH$_2$CO | —C$_2$H$_5$ | " |
| 21 | " | —OC$_2$H$_5$ | —NHCOCH$_3$ | —CH$_2$CH=CH$_2$ | —CH$_2$CH=CH$_2$ | " |
| 22 | " | —OCH$_3$ | —CH$_3$ | " | " | violet |
| 23 | " | " | " | —CH$_2$CH=CHCl | —CH$_2$CH=CHCl | " |
| 24 | " | " | " | —CH$_2$CH$_2$COOCH$_2$CH=CHCl | H | " |
| 25 | —CH=NOH | " | —NHCOCH$_3$ | —CH$_2$CH$_2$CN | —CH$_2$CH$_2$OCOCH$_3$ | " |
| 26 | " | H | —NHCOCHOHCH$_3$ | —n-C$_4$H$_9$ | —n-C$_4$H$_9$ | " |
| 27 | " | H | —NHCOOCH$_2$CH$_2$OC$_2$H$_5$ | —C$_2$H$_5$ | —C$_2$H$_4$OH | " |
| 28 | " | H | —NHCOCH$_2$H$_4$Cl | " | —C$_2$H$_5$ | " |
| 29 | " | H | —NHCOC$_6$H$_5$ | —CH$_3$ | H | " |
| 30 | " | H | —CH$_3$ | —C$_2$H$_5$ | —CH$_2$CH$_2$OCONHC$_6$H$_5$ | " |
| 31 | " | H | " | —CH$_2$CH$_2$OCH$_2$CH=CH$_2$ | —CH$_2$CH$_2$OCH$_2$CH=CH$_2$ | ruby |
| 32 | " | H | " | —CH$_2$CH$_2$CN | —C$_2$H$_5$ | " |
| 33 | " | H | " | —CH$_2$CH$_2$CN | —CH$_2$CH$_2$OCOCH$_3$ | " |
| 34 | " | H | " | —CH$_2$CH$_2$COOCH$_3$ | " | " |
| 35 | " | H | H | —CH$_2$CH$_2$OH | " | " |
| 36 | " | H | H | —CH$_2$CH$_2$OCOOCH$_2$CH$_2$OC$_2$H$_5$ | —CH$_2$CH$_2$CN | " |
| 37 | —CN | H | H | —CH$_2$CH$_2$OCH$_2$CH=CH$_2$ | —CH$_2$CH$_2$C$_6$H$_5$ | red |
| 38 | " | H | —NHCOCH$_3$ | —CH$_2$CH$_2$CN | —CH$_2$CH$_2$CN | " |
| 39 | " | —OC$_2$H$_5$ | " | —CH$_2$CH=CH$_2$ | —CH$_2$CH=CH$_2$ | blue |
| 40 | " | —OCH$_3$ | " | —CH$_2$CH$_2$CN | —CH$_2$CH=CH$_2$ | " |
| 41 | —CHO | —OC$_2$H$_5$ | " | —C$_2$H$_4$COOCH$_3$ | H | " |
| 42 | " | —OCH$_3$ | " | —C$_2$H$_4$COOC$_2$H$_5$ | H | " |
| 43 | " | " | " | —C$_2$H$_4$COO(CH$_2$)$_3$CH$_3$ | H | " |
| 44 | " | " | " | —C$_2$H$_4$COOCH$_2$CH=CH—Cl | H | " |
| 45 | " | OC$_2$H$_5$ | " | —C$_2$H$_4$COOCH$_2$CH=CH$_2$ | H | " |

TABLE 1-continued

| Ex. No. | R | R₆ | R₅ | R₇ | R₈ | Shade on polyester fibres |
|---|---|---|---|---|---|---|
| 46 | " | " | " | —CH₂—NCO—C₆H₄CO | H | " |
| 47 | " | " | " | —CH(CH₃)(CH₂)₃CH₃ | H | " |
| 48 | " | " | " | CH(CH₃)CH₂COOC₂H₅ | H | " |
| 49 | " | " | " | —C₂H₄OCOCH₃ | H | " |
| 50 | " | OCH₃ | " | —C₂H₄OCOCH₃ | —CH₂CH=CH₂ | " |
| 51 | " | —OCH₃ | " | —C₂H₄CN | H | " |
| 52 | " | —OC₂H₅ | " | CH₃ | —CH₂CH=CH—Cl | " |
| 53 | " | —OC₂H₅ | " | CH₂CH=CH₂ | H | " |
| 54 | " | " | " | —CH₂CH=CH—Cl | —C₂H₄COOCH₃ | " |
| 55 | " | " | " | —C₂H₄OCOCH₃ | " | " |
| 56 | " | " | " | —CH₂CHOHCH₃ | " | " |
| 57 | " | " | " | —C₂H₄COOCH₃ | " | " |
| 58 | " | " | " | —CH₂C≡CH | " | " |
| 59 | " | " | " | —CH₂CHOHCH₂Cl | —C₂H₄COOC₂H₅ | " |
| 60 | " | " | —CH₃ | —C₂H₅ | —C₂H₅ | violet |
| 61 | " | H | " | " | —C₂H₄OCH₂CH=CH₂ | " |
| 62 | " | H | " | " | —C₂H₄OH | " |
| 63 | " | H | " | " | —C₂H₄OCOCH₃ | " |
| 64 | " | H | " | " | CH₂CH(OCOCH₃)CH₂OCOCH₃ | " |
| 65 | " | H | " | " | —CH₂CHOHCH₂Cl | " |
| 66 | " | H | " | " | —CH₂CHOHCH₂Cl | " |
| 67 | " | H | " | " | —CH₂—CH₂OC₆H₅ | " |
| 68 | " | H | " | " | —CH₂CH=CH₂ | " |
| 69 | " | H | " | " | —CH₂CH=CH—Cl | " |
| 70 | " | H | " | " | —CH₂C(CH₃)=CH₂ | " |
| 71 | " | H | " | " | —CH₂CHOHCH₂O—CH₂C≡CH | " |
| 72 | " | H | " | " | —CH₂—C₆H₅ | " |
| 73 | " | H | " | " | —C₂H₄OCOCH₂Cl | " |
| 74 | " | H | " | " | —C₂H₄CONHC₆H₅ | " |
| 75 | " | H | " | " | —CH₂CH₂COOCH₃ | " |
| 76 | " | H | " | " | —CH₂CHOHCH₂SCN | " |
| 77 | " | H | " | " | —CH₂CH₂OCONHCH₃ | " |
| 78 | " | H | " | " | —CH₂CHOH—CH₃ | " |
| 79 | " | H | " | " | " | " |
| 80 | " | H | " | " | —CH₂CH₂—S—C=N—C₆H₄—S(o-) | " |
| 81 | " | H | —NHCOCH₃ | —CH₃ | —C₂H₅ | " |
| 82 | " | H | " | " | —CH₂CH₂COOC₂H₅ | " |
| 83 | " | H | " | —CH₂CH(CH₃)—CH₃ | —CH₂C(CH₃)=CH₂ | " |
| 84 | " | H | " | —CH₂CH₂OCOCH₃ | —CH₂CH(CH₃)—CH₃ | " |
| 85 | " | H | —NHCONHC₂H₅ | —CH₃ | —CH₂CH₂OCOCH₃ | " |
| 86 | " | H | —NHCOC₂H₄Cl | " | —C₂H₄OCOOC₂H₅ | " |
| 87 | " | H | —NHCOC₂H₅ | —CH₂CH=CH₂ | —CH₂CH=CH₂ | " |
| 88 | " | H | —NHCOCH₃ | —C₂H₄CN | —CH₂CH=CH—Cl | " |

TABLE 1-continued
| Ex. No. | R | R$_6$ | R$_5$ | R$_7$ | R$_8$ | Shade on polyester fibres |
|---|---|---|---|---|---|---|
| 89 | " | H | —NHCHO | —C$_2$H$_4$OCH$_3$ | —C$_2$H$_4$OCH$_3$ | " |
| 90 | " | H | —NHCOOC$_2$H$_4$OC$_2$H$_5$ | —CH$_2$CH=CH$_2$ | —CHCH=CH$_2$ | " |
| 91 | " | H | Cl | —C$_2$H$_5$ | —C$_2$H$_5$ | " |
| 92 | " | H | CN | " | n-C$_4$H$_9$ | " |
| 93 | " | H | H | n-C$_3$H$_7$ | —CH$_2$CH(CH$_3$)—CH$_3$ | " |
| 94 | " | H | H | n-C$_4$H$_9$ | n-C$_3$H$_7$ | " |
| 95 | " | H | H | —CH$_3$ | n-C$_4$H$_9$ | " |
| 96 | " | H | H | —C$_2$H$_4$OH | n-C$_6$H$_{13}$ | " |
| 97 | " | H | H | —C$_2$H$_4$CN | n-C$_8$H$_{17}$ | " |
| 98 | " | H | H | " | —CH$_2$CBr=CH$_2$ | ruby |
| 99 | " | H | H | " | —CH$_2$CH$_2$OCOCH$_3$ | " |
| 100 | | | | | | blue |
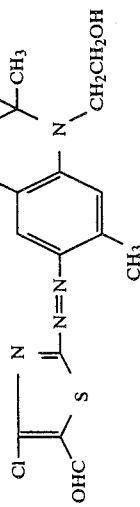

EXAMPLE 101

(a) A diazonium solution is prepared as described in Example 1 and is added to a mixture of 16.3 parts 1-diethylamino-3-methylbenzene, 5 parts amidosulphonic acid and 100 parts 10% aqueous sulphuric acid. The dyestuff obtained of formula (a)

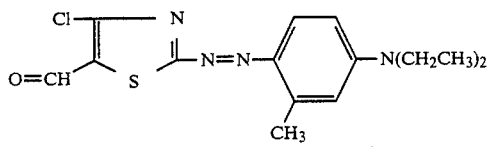

dyes textiles of linear, aromatic polyesters and cellulose acetate in brilliant violet shades with good fastnesses.

(b) 8.4 Parts of the dyestuff of formula (a) are suspended in 40 parts dioxane, 7 parts cyanoacetic-acid-n-butylester, 1 part glacial acetic acid and 1 part piperdine. Stirring is effected for 2 hours at 25° and the condensation product of formula (b)

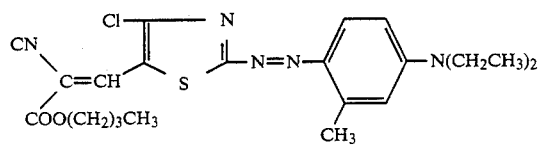

is filtered off. The dyestuff dyes textile materials of linear, aromatic polyesters or cellulose acetate in very brilliant blue shades with good light fastness.

(c) The dye of (b) can also be obtained by the following reaction scheme.

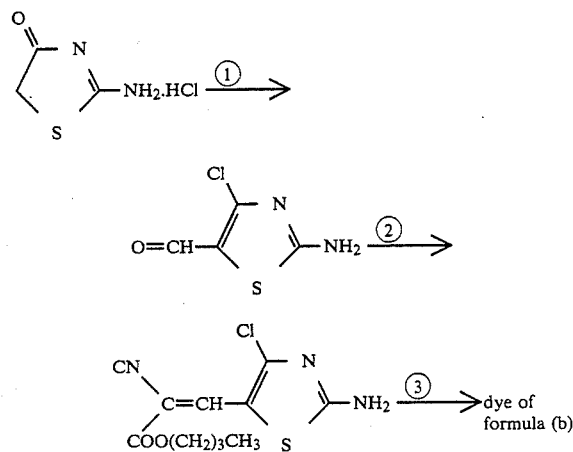

Reaction step ① is described in Example 1.
Reaction step ②

16.25 Parts 2-amino-4-chloro-5-formylthiazole are suspended in 100 parts ethanol, 28 parts cyanoacetic acid-n-butylester, 1 part glacial acetic acid and 1 part piperidine and are stirred for 3 hours at 55° C. The whole is cooled to 0° and the condensation product of formula

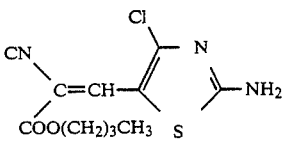

is filtered off and dried in a vacuum cupboard at 50°.

Reaction step ③

28.5 Parts of the product of reaction step ② are dissolved in 150 parts 85% phosphoric acid and added dropwise over 20 minutes at $-5°$ to 34 parts 40% nitrosylsulphuric acid. The mixture is stirred for 2 hours at $-5°$. The resulting diazonium salt solution is added over 30 minutes to a mixture of 16.3 parts 1-diethylamino-3-methylbenzene, 5 parts amidosulphonic acid and 500 parts 10% aqueous sulphuric acid. The grey black dyestuff suspension is stirred at 0° for 1 hour and then filtered off from the mother liquor. The filter cake is washed acid free and dried in a vacuum cupboard at 50°.

The dyestuffs of the following Table 2 are made in analogous manner to the procedure described in Examples 1 and 101. They correspond to the formula

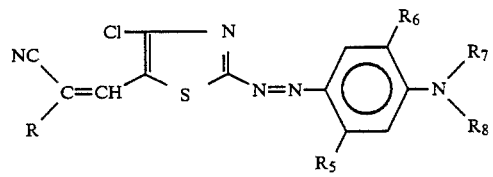

and dye polyester in blue shades with good fastnesses. $R_5$ is methyl in Examples 102 to 134 and 161 to 168, hydrogen in Examples 135 to 160, methoxy in Examples 169 and 170, acetylamino in Examples 171 to 177 and 181 to 199, propionylamino in Example 178, methoxycarbonylamino in Example 179, β-chloropropionylamino in Example 180 and β-ethoxyethoxycarbonylamino in Example 200.

In Examples 102 to 160 and 171 to 180 $R_6$ is hydrogen, in Examples 161 to 170 and 186 to 191 it is methoxy and in Examples 181 to 185 and 192 to 200 it is ethoxy. In Examples 101 to 200 R is a group of formula (a) —COOCH$_2$CH$_2$CH$_2$CH$_3$, (b) —COOCH$_2$C(CH$_3$)=CH$_2$, (c) —COOCH$_2$CH(CH$_3$)$_2$, (d) —COOCH$_2$CH$_2$CH$_3$, (e) —COOCH$_2$CH$_2$CH$_2$Cl, (f) —COOCH$_2$CH=CHCl, (g) —COOCH$_2$CH$_2$CH$_2$CH$_3$, (h) —COOCH(CH$_3$)$_2$resp. (i) —COOCH$_2$CH=CH$_2$.

TABLE 2

| Ex. No. | $R_7$ | $R_8$ |
|---|---|---|
| 102 | —C$_2$H$_5$ | —CH$_2$CH$_2$CH$_3$ |
| 103 | " | —CH$_2$CH$_2$OCOCH$_3$ |
| 104 | " | —CH$_2$CHOHCH$_3$ |
| 105 | " | —CH$_2$CHOHCH$_2$CH$_3$ |
| 106 | " | —CH$_2$CH(OCOCH$_3$)CH$_3$ |
| 107 | " | —CH$_2$CH=CH$_2$ |
| 108 | " | —CH$_2$C(CH$_3$)=CH$_2$ |
| 109 | " | —CH$_2$CH=CH—Cl |

TABLE 2-continued

| Ex. No. | R7 | R8 |
|---|---|---|
| 110 | " | —CH₂CHOHCH₂CL |
| 111 | " | —CH₂CH₂OC₆H₅ |
| 112 | " | —CH₂CH(OCOCH₃)CH₂OCOCH₃ |
| 113 | " | —CH₂CH₂OCH₃ |
| 114 | " | —CH₂CHOHCH₂OCH₂C≡CH |
| 115 | " | —CH₃ |
| 116 | " | —CH₂CH₂COOC₂H₅ |
| 117 | " | —CH₂CH₂OCH₂—CH=CH₂ |
| 118 | " | —CH₂CH₂CH₂CH₃ |
| 119 | " | —CH₂CH₂—OCH₂C≡CH |
| 120 | " | —CH₂CH₂OCOOC₂H₅ |
| 121 | " | —C₂H₄CN |
| 122 | " | —CH₂CH(CH₃)—CH₃ |
| 123 | " | —CH₂CH₂Cl |
| 124 | " | —CH(CH₃)₂ |
| 125 | " | —CH₂—C₆H₅ |
| 126 | —CH₃ | —CH₃ |
| 127 | " | —C₂H₅ |
| 128 | " | —CH₂CH₂CH₃ |
| 129 | " | —CH₂CH₂CH₂CH₃ |
| 130 | " | —CHCH₂OCOCH₃ |
| 131 | " | —CHCHOHCH₂CH₃ |
| 132 | " | —CH₂CH₂OCH₃ |
| 133 | —CH₂CH=CH₂ | —CH₂CH=CH₂ |
| 134 | —CH₂C(CH₃)=CH₂ | —CH₂C(CH₃)=CH₂ |
| 135 | —CH₂CH₂CH₃ | —CH₂CH₂CH₃ |
| 136 | " | —CH(CH₃)₂ |
| 137 | —CH₂CH₂CH₂CH₃ | —CH₂CH₂CH₂CH₃ |
| 138 | " | —CH₃ |
| 139 | —C₂H₅ | —CH₂CHOHCH₂CH₃ |
| 140 | " | —CH₂CH₂CH₂CH₃ |
| 141 | " | —C₂H₅ |
| 142 | " | —CH₂CH₂CH₃ |
| 143 | " | —CH₂CH₂CH₂CH₃ |
| 144 | " | —CH₂CH=CH₂ |
| 145 | " | —CH₂C(CH₃)=CH₂ |
| 146 | " | —CH(CH₃)₂ |
| 147 | " | —CH₂CH(CH₃)₂ |
| 148 | " | —CH₂CH(OCOCH₃)CH₃ |
| 149 | " | —CH₂CHOH—CH₂CH₃ |
| 150 | —CH₃ | —CH₂CH₂CH₂CH₃ |
| 151 | " | —CH₂CHOHCH₂CH₃ |
| 152 | —CH₂CH₂CH₃ | —CH₂CH₂CH₃ |
| 153 | " | —CH₂CH=CH₂ |
| 154 | —CH₂CH₂CH₂CH₃ | —CH₂CH₂CH₂CH₃ |
| 155 | —CH(CH₃)₂ | —CH(CH₃)₂ |
| 156 | —CH₂CH(CH₃)₂ | —CH₂CH(CH₃)₂ |
| 157 | —CH₂C(CH₃)=CH₂ | —CH₂C(CH₃)=CH₂ |
| 158 | —C₂H₅ | —CH₂CH₂CH₂OCOCH₃ |
| 159 | " | —CH₂C₆H₅ |
| 160 | " | —CH₂CH₂COOC₂H₅ |
| 161 | —CH₃ | —CH₂CH₂COOCH₃ |
| 162 | " | —CH₂CHOH—CH₂CH₃ |
| 163 | " | —CH₂CH=CH—Cl |
| 164 | —C₂H₅ | —CH₂CH₂CN |
| 165 | —CH₂CH=CH₂ | —CH₂CH=CH₂ |
| 166 | —CH₂CH₂OCH₃ | —CH₂CH₂OCH₃ |
| 167 | H | —CH₂CH₂COOCH₂CH=CHCl |
| 168 | " | —CH₂CHOHCH₂Cl |
| 169 | " | —CH₂CH₂COOCH₂CH(CH₃)₂ |
| 170 | —CH₃ | —CH₂CH₂COOC₂H₅ |
| 171 | " | —C₂H₅ |
| 172 | " | —CH₂CH₂CH₂CH₃ |
| 173 | —C₂H₅ | —C₂H₅ |
| 174 | " | —CH₂CH₂COOCH₃ |
| 175 | " | —CH₂CHOH—CH₃ |
| 176 | —CH₂—CH=CH₂ | —CH₂CH=CH₂ |
| 177 | —CH₂CH₂CH₃ | —CH₂CH₂CH₃ |
| 178 | —C₂H₅ | —C₂H₅ |
| 179 | " | " |
| 180 | " | " |
| 181 | —CH₃ | —CH₃ |
| 182 | " | —CH₂CH₂OCOCH₃ |
| 183 | " | —CH₂CH=CH₂ |
| 184 | " | —CH₂CH=CH—Cl |
| 185 | —C₂H₅ | —C₂H₅ |
| 186 | —CH₂CH=CH₂ | —CH₂CH=CH₂ |
| 187 | " | —CH₂CH₂CN |
| 188 | —CH₂CH=CH—Cl | " |
| 189 | " | —CH₂CH₂OCOCH₃ |

TABLE 2-continued

| Ex. No. | $R_7$ | $R_8$ |
|---|---|---|
| 190 | —CH$_2$CH$_2$OCOCH$_3$ | " |
| 191 | —CH$_2$CH$_2$COOCH$_3$ | —CH$_2$CH=CH$_2$ |
| 192 | —CH$_2$CH$_2$—NCOCH$_2$CH$_2$—CO | H |
| 193 | —CH$_2$—NCOCH$_2$CH$_2$CO | " |
| 194 | —CH$_2$CH$_2$COOC$_2$H$_5$ | " |
| 195 | —CH$_2$CH$_2$COOCH$_2$CH=CH$_2$ | " |
| 196 | —CH$_2$CH$_2$OCOCH$_3$ | " |
| 197 | —CH$_2$CH$_2$CN | " |
| 198 | —CH$_2$CHOHCH$_2$Cl | " |
| 199 | —CH$_3$ | " |
| 200 | H | " |

The dyestuffs of the following Table 3 are also made in analogous manner to the procedure of Examples 1 and 101. They correspond to the formula

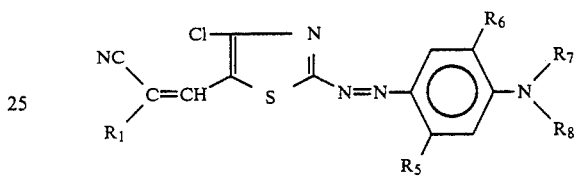

and dye polyester in blue shades.

TABLE 3

| Ex. No. | $R_1$ | $R_6$ | $R_5$ | $R_7$ | $R_8$ |
|---|---|---|---|---|---|
| 201 | —COO(CH$_2$)$_5$CH$_3$ | H | —CH$_3$ | —C$_2$H$_5$ | —CH$_2$CHOH—CH$_3$ |
| 202 | —COO(CH$_2$)$_7$CH$_3$ | H | " | " | —CH$_2$CH$_2$OH |
| 203 | —COOCH$_2$CH$_2$Cl | H | " | " | —CH$_2$CH$_2$COOC$_2$H$_5$ |
| 204 | —COOCH$_2$C≡CH | H | " | —CH$_2$CH$_2$CH$_2$CH$_3$ | —CH$_2$CH$_2$CH$_2$CH$_3$ |
| 205 | —COOCH(CH$_2$OH)CH$_2$—Cl | H | " | " | " |
| 206 | —COOCH$_2$CH=CH$_2$ | H | " | " | " |
| 207 | —COOCH$_2$CH=CH—CH$_3$ | H | " | —C$_2$H$_5$ | —C$_2$H$_5$ |
| 208 | —COOCH(CH$_2$OCOCH$_3$)CH$_3$ | H | " | " | " |
| 209 | —COO(CH$_2$)$_3$CH=CH$_2$ | H | " | " | " |
| 210 | —COO(CH$_2$)$_2$CH=CH$_2$ | H | " | " | " |
| 211 | —COO(CH$_2$)$_2$CH(CH$_3$)$_2$ | H | " | " | " |
| 212 | —COOCH(CH$_3$)CH$_2$CH$_2$CH$_3$ | H | " | " | " |
| 213 | —COOCH$_2$C$_6$H$_5$ | H | " | " | " |
| 214 | —COOCH$_2$CHOH—CH$_3$ | H | " | " | " |
| 215 | —COOCH$_2$CBr=CH$_2$ | H | " | " | " |
| 216 | —COOCH$_2$CH$_2$CH$_2$Br | H | " | " | " |
| 217 | —COOCH$_2$CH=CHBr | H | " | " | " |
| 218 | —COOCH(CH$_3$)CH$_2$CH$_3$ | H | " | " | " |
| 219 | —COOC(CH$_3$)$_3$ | H | " | " | " |
| 220 | —COOCH$_2$CN | H | " | " | " |
| 221 | —COOC$_2$H$_5$ | H | " | —CH$_2$CH$_2$ClCH$_3$ | —CH$_2$CH$_2$CH$_2$CH$_3$ |
| 222 | —COOCH$_3$ | H | " | —C$_2$H$_5$ | —C$_2$H$_4$OCOO(CH$_2$)$_9$CH$_3$ |
| 223 | —COOC$_2$H$_4$COOC$_2$H$_5$ | H | " | " | —C$_2$H$_5$ |
| 224 | —COOCH(CH$_3$)CH$_2$OCOCH$_3$ | H | " | " | " |
| 225 | —COOCH(C$_2$H$_5$)CH$_2$OH | H | " | " | " |
| 226 | —COOCH$_2$CHBrCl | H | " | " | " |
| 227 | —COOCH$_2$CH$_2$OCOCH$_3$ | H | " | " | " |
| 228 | —COOCH$_2$C(CH$_3$)$_3$ | H | " | " | " |
| 229 | —COOCH$_2$CH$_2$OC$_2$H$_5$ | H | " | —CH$_2$CH$_2$CH$_2$CH$_3$ | —CH$_2$CH$_2$CH$_2$CH$_3$ |
| 230 | —COOCH$_3$ | H | " | " | " |
| 231 | —CONH$_2$ | H | " | " | " |
| 232 | —CONHC$_6$H$_5$ | H | " | —CH$_2$CH$_2$OH | " |
| 233 | —COOCH$_2$C$_6$H$_4$—Cl(p) | —OC$_2$H$_5$ | —NHCOCH$_3$ | H | H |
| 234 | —COO(CH$_2$)$_9$CH$_3$ | " | " | H | H |
| 235 | —COOC$_6$H$_{11}$ | —OC$_2$H$_4$OCH$_3$ | —NHCOC$_2$H$_4$Cl | H | H |
| 236 | —CN | H | —CH$_3$ | —C$_2$H$_5$ | (CH$_2$)$_7$CH$_3$ |
| 237 | " | H | " | " | —C$_2$H$_4$OCOOC$_2$H$_4$OC$_2$H$_5$ |
| 238 | —CO—C$_6$H$_4$NO$_2$(p) | H | " | —C$_2$H$_4$OCOCH$_3$ | —C$_2$H$_4$OCOCH$_3$ |
| 239 | —CO—C$_6$H$_5$ | H | " | —C$_2$H$_5$ | —C$_2$H$_5$OCHO |
| 240 | —CO—CH$_3$ | H | " | —(CH$_2$)$_5$CH$_3$ | —(CH$_2$)$_5$CH$_3$ |
| 241 | —CSNH$_2$ | H | " | —C$_2$H$_5$ | " |
| 242 | —SO$_2$CH$_3$ | H | " | —CH$_2$CH$_2$COOC$_2$H$_5$ | —CH$_2$C(CH$_3$)=CH$_2$ |
| 243 | —SO$_2$—C$_6$H$_5$ | H | " | —C$_2$H$_4$OCOCH$_3$ | —C$_2$H$_4$OCOCH$_3$ |

TABLE 3-continued

| Ex. No. | R₁ | R₆ | R₅ | R₇ | R₈ |
|---|---|---|---|---|---|
| 244 | —SO₂C₆H₄CH₃(p) | H | " | —C₂H₄CN | " |
| 245 | —C₆H₄—NO₂(p) | H | " | —C₂H₅ | —CH₂CH₂OCH₂CH=CH₂ |
| 246 | " | H | —NHCOCH₃ | " | —CH₂CHOH—CH₃ |
| 247 | benzimidazolyl(2)- | H | —CH₃ | " | —C₂H₅ |
| 248 | —COO(CH₂)₃CH₃ | H | " | —CH₂CH₂CH₂CH₂CH₂— | |

249

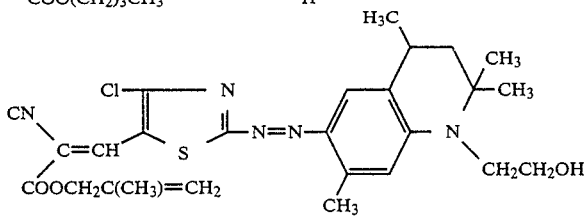

250

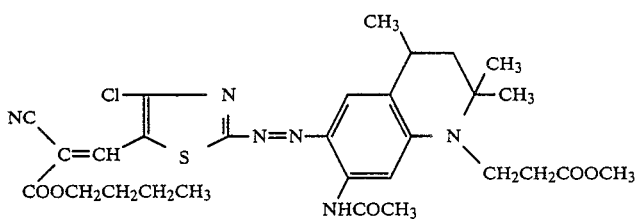

EXAMPLE 251

Proceeding as described in Example 1 and reacting the diazonium salt solution described therein with a mixture of 22.1 parts N-ethyl-N-acetoxyethyl-m-toluidine, 5 parts urea, 100 parts glacial acetic acid and 200 parts ice, the dyestuff of to formula (c)

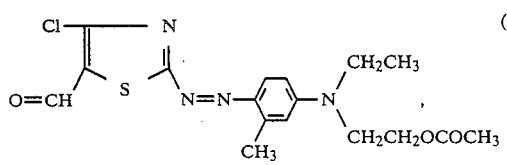

which dyes polyesters and cellulose acetate in brilliant violet shades, is obtained.

9.9 Parts of the dyestuff of formula (c) are suspended in 50 parts nitromethane at 10°, 1 part 10% sodium methoxide solution is stirred in and the reaction mixture is stirred further at 10° for 3 hours. 25 parts acetic acid anhydride are added and the whole is heated to 100° in 10 minutes. Stirring is effected at 100° for 30 minutes, the whole is allowed to cool and the precipitated dyestuff of formula (d)

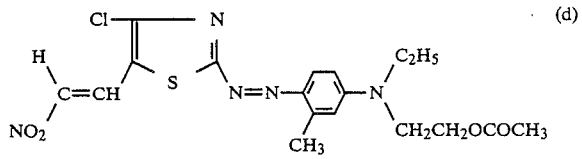

is filtered off. This dyestuff dyes polyester and cellulose acetate in brilliant blue tones.

Further dyes which are made in analogy with the procedure of Examples 1 and 251 are given in the following Table 4. They correspond to the formula

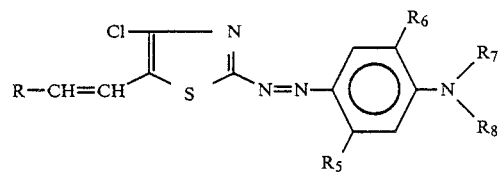

In Examples 252 to 287 R is nitro, in Example 288 —CH=CNNO₂ and in Example 289 —CH=C(C₂H₅)—NO₂. The dyestuffs of Examples 252 to 280 and 285 to 289 dye polyester fibres in blue shades and those of Examples 281 to 284 in violet shades.

TABLE 4

| Ex. No. | R₆ | R₅ | R₇ | R₈ |
|---|---|---|---|---|
| 252 | —OC₂H₅ | —NHCOCH₃ | —CH₂CH₂CN | —CH₂CH=CH₂ |
| 253 | " | " | " | —CH₂CH=CH—Cl |
| 254 | " | " | —CH₂CH₂COOCH₃ | —CH₂C≡CH |
| 255 | " | " | —CH₂CH₂COOC₂H₅ | —CH₃ |
| 256 | " | " | —CH₂CH₂CN | " |
| 257 | " | " | —C₂H₄OCOCH₃ | —C₂H₄OCOCH₃ |
| 258 | —OCH₃ | " | —CH₂CH=CH—Cl | —CH₂CH=CHCl |
| 259 | " | " | —CH₂CH=CH₂ | —CH₂CH=CH₂ |
| 260 | " | " | —CH₃ | —CH₃ |
| 261 | H | " | —CH₂CH(CH₃)₂ | —CH₂CH(CH₃)₂ |
| 262 | H | " | —C₂H₅ | —C₂H₅ |
| 263 | H | " | —C₂H₄OCH₃ | —C₂H₄OCH₃ |
| 264 | H | —NHCOC₂H₅ | —C₂H₅ | —C₂H₅ |

TABLE 4-continued

| Ex. No. | $R_6$ | $R_5$ | $R_7$ | $R_8$ |
|---|---|---|---|---|
| 265 | H | —NHCOC$_2$H$_4$Cl | " | " |
| 266 | H | —NHCOOCH$_3$ | " | " |
| 267 | H | —NH—CHO | —C$_6$H$_{13}$(n) | —C$_6$H$_{13}$(n) |
| 268 | —OC$_2$H$_5$ | —NHCOCH$_3$ | —C$_2$H$_4$COOCH$_2$CH=CHCl | H |
| 269 | " | " | —C$_2$H$_4$COOCH$_2$CH$_2$OCH$_3$ | H |
| 270 | H | " | —C$_2$H$_4$COOCH$_2$CH(CH$_3$)$_2$ | H |
| 271 | H | —CH$_3$ | —C$_2$H$_5$ | —CH$_2$CHOHCH$_2$CH$_3$ |
| 272 | H | " | " | —C$_2$H$_4$OCOCH$_3$ |
| 273 | H | " | " | —C$_2$H$_4$OCH$_2$C$_6$H$_5$ |
| 274 | H | " | " | —C$_2$H$_4$OCH$_2$CH=CH—Cl |
| 275 | H | " | —C$_4$H$_9$(n) | —C$_4$H$_9$(n) |
| 276 | H | " | —CH$_2$CH(CH$_3$)$_2$ | —CH$_2$CH(CH$_3$)$_2$ |
| 277 | H | " | —C$_2$H$_5$ | —CH$_2$C(CH$_3$)=CH$_2$ |
| 278 | H | " | " | —CH$_2$—C$_6$H$_5$ |
| 279 | —OCH$_3$ | " | —CH$_3$ | —CH$_2$CH=CH—CH$_3$ |
| 280 | " | " | —CH$_2$CH=CH$_2$ | —CH$_2$CH=CH$_2$ |
| 281 | " | " | —C$_2$H$_4$COOCH$_2$CH=CH—Cl | H |
| 282 | " | " | —C$_2$H$_4$COO(CH$_3$)$_3$CH$_3$ | H |
| 283 | H | H | —C$_6$H$_5$ | H |
| 284 | H | H | —C$_2$H$_4$CN | —C$_2$H$_4$C$_6$H$_5$ |
| 285 | —OC$_2$H$_5$ | —NHCOCH$_3$ | —CH(CH$_3$)—CH$_2$COOC$_2$H$_5$ | H |
| 286 | —OC$_2$H$_5$ | —NHCOCH$_3$ | —C$_2$H$_4$COOCH$_3$ | H |
| 287 | " | —NHCOOC$_2$H$_4$OC$_2$H$_5$ | —CH$_3$ | H |
| 288 | " | —NHCOCH$_3$ | —CH$_2$CH=CH$_2$ | —CH$_2$CH=CH$_2$ |
| 289 | " | " | —C$_2$H$_4$CN | " |

The dyestuffs of the following Table 5 are prepared in analogy to the procedure of Examples 1, 101 and 251. They correspond to the formula

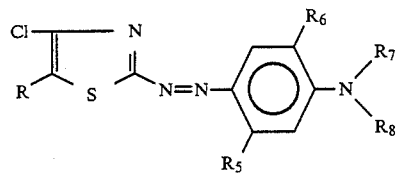

and dye polyester fibres in blue tones.

perlon in clear scarlet shades with good wet-, light- and sublimation-fastness, is of formula

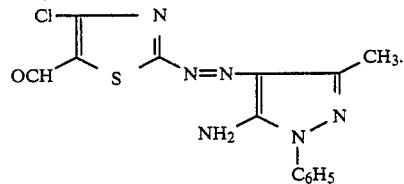

Further dyes having the same good light and sublima-

TABLE 5

| Ex. No. | R | $R_5$ | $R_6$ | $R_7$ | $R_8$ |
|---|---|---|---|---|---|
| 290 | —CHO | —NHCOCH$_3$ | —OCH$_3$ | —CH(CH$_3$C$_4$H$_9$(n) | H |
| 291 | —CH=C(CN)COOCH$_2$CH$_2$OC$_2$H$_5$ | " | —OC$_2$H$_5$ | —CH(CH$_3$)C$_6$H$_{11}$ | H |
| 292 | —CHO | " | " | —CH(CH$_3$)CH$_2$OCH$_2$CH$_2$OCH$_3$ | H |
| 293 | —CH=C(CN)COOCH$_2$C(CH$_3$)=CH$_2$ | " | —OCH$_2$CH$_2$OCH$_3$ | —CH$_2$CH$_2$COOC$_2$H$_5$ | H |
| 294 | —CH=CH—CO—C$_6$H$_4$NO$_2$(para) | " | —OC$_2$H$_5$ | " | H |
| 295 | —CH=CHCN | " | " | —CH$_2$CH=CH$_2$ | —CH$_2$CH=CH$_2$ |
| 296 | —CH=CHCHO | " | " | —CH$_2$CH$_2$CN | " |
| 297 | —CH=CH—CH=C(CN)COOC$_2$H$_5$ | —CH$_3$ | " | —C$_2$H$_5$ | —C$_2$H$_5$ |
| 298 | —CH=CH—C$_6$H$_5$ | " | —OCH$_3$ | " | —CH$_2$CH$_2$CN |
| 299 | —CH=CH—C$_6$H$_4$NO$_2$(para) | " | " | " | —CH$_2$CH$_2$OCOCH$_3$ |

EXAMPLE 300

12.2 Parts 2-amino-4-chloro-5-formylthiazole are stirred in 50 parts glacial acetic acid and 25 parts 85% formic acid and cooled to 0°. At 0° to 5°, 5 parts pulverised sodium nitrite are shaken in portionwise over a period of 30 minutes and the whole is stirred for a further hour at 0° to 5°.

12.5 Parts 1-phenyl-3-methyl-5-aminopyrazole are dissolved in 50 parts glacial acetic acid and added to the above-mentioned suspension of 2-nitrosamine-4-chlorothiazole-5-aldehyde. Stirring is effected at room temperature until no nitrosamine compound is detectable by thin layer chromatography. After cooling the dyestuff is precipitated with water, filtered and dried. The dyestuff, which dyes polyester, cellulose triacetate and tion fastnesses are obtained by replacing 1-phenyl-3-methyl-5-aminopyrazole with the compounds given in Table 6.

TABLE 6

| Ex. No. | compound | Shade on polyester fibres |
|---|---|---|
| 301 | 1-phenyl-3-methylpyrazolone-5 | red |
| 302 | 3-methylpyrazolone-5 | " |
| 303 | 1-(β-hydroxyethyl)-3-methylpyrazolone-5 | " |
| 304 | 1-n-butyl-3-cyano-4-methyl-6-hydroxypyridone-2 | " |
| 305 | 1-methyl-2-phenylindole | " |
| 306 | 2-hydroxydiphenyl | " |
| 307 | p-cresol | " |
| 308 | 2-hydroxynaphthalene-3-carboxylic acid ethyl ester | " |
| 309 | N—benzyl-2,2,4-trimethyl-1,2,3,4-tetrahydro- | violet |

TABLE 6-continued

| Ex. No. | compound | Shade on polyester fibres |
|---|---|---|
| | quinoline | |
| 310 | N—methyl-2,2,4-trimethyl-1,2,3,4-tetrahydro-quinoline | " |
| 311 | N—acetoxyethyl-2,2,4-trimethyl-1,2,3,4-tetra-hydroquinoline | " |
| 312 | 2-diethylamino-4-phenyl-1,3-thiazole | violet |
| 313 | 2-benzylamino-3-cyano-4-methyl-6-(β hydroxyethyl)-pyridine | red |
| 314 | N—ethoxyethyl-2,2,4-trimethyl-1,2,3,4-tetra-hydroquinoline | violet |
| 315 | 2,6-di(n-butylamino)-3-cyano-4-methylpyridine | red |
| 316 | 2,6-di-(3'-methoxypropylamino)-3-cyano-4-methylpyridine | " |
| 317 | N—(3'-methoxypropylamino)-4-hydroxy-naphthalimide | violet |
| 318 | 2-benzylamino-3-cyano-4,6-bis-methylaminopyridine | red |
| 319 | 2,4,6-tris(3'-methoxypropylamino)-3-cyanopyridine | " |
| 320 | 1-N—cyanoethyl-naphthylamine | blue |

APPLICATION EXAMPLE

7 Parts of the dye of Example 1 are ground to a fine powder with 4 parts sodium dinaphthylmethanedisulphonic acid, 4 parts sodium cetyl sulphate and 5 parts anhydrous sodium sulphate in a ball mill for 48 hours.

1 Part of the so obtained dyestuff preparation is pasted with a little water and the suspension is added through a sieve to a dyebath containing 4000 parts water and 3 parts sodium laurylsulphate. The liquor ratio is 1:40. 100 parts polyester fibres are added at 40° to 50° and 20 parts chlorinated benzene emulsified in water are added thereto. The bath is slowly heated to 100° and dyeing is effected for 1 to 2 hours at 95° to 100°. The blue-dyed fibres are washed, soaped, washed again and dried. The dyeing is level and has good fastnesses to light, overdyeing, washing, water, sea-water, sweat, sublimation, fumes thermofixation, pleating and permanent pressing.

What is claimed is:

1. A compound of the formula

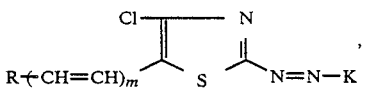

wherein

K is the radical of a coupling component, said coupling component being 1-phenyl-3-methyl-5-aminopyrazole, 1-phenyl-3-methylpyrazolone-5,3-methylpyrazolone-5,1-(2'-hydroxyethyl)-3-methyl-pyrazolone-5,1-n-butyl-3-cyano-4-methyl-6-hydroxypyridone-2,1-methyl-2-phenylindole, 2-hydroxydiphenyl, p-cresol, 2-hydroxynaphthalene-3-carboxylic acid ethyl ester, 2-diethylamino-b 4-phenyl-1,3-thiazole, 2-benzylamino-3-cyano-4-methyl-6-(2'-hydroxyethyl)pyridine, 2,6-di-(n-butylamino)-3-cyano-4-methylpyridine, 2,6-di(3'-methoxypropylamino)-3-cyano-4-methylpyridine, 2-benzylamino-3-cyano-4,6-di-(methylamino)pyridine, 2,4,6-tri-(3'-methoxypropylamino)-3-cyanopyridine, 1-(N-cyanoethyl)naphthylamine or N-(3'-methoxypropylamino)-4-hydroxynaphthalimide,

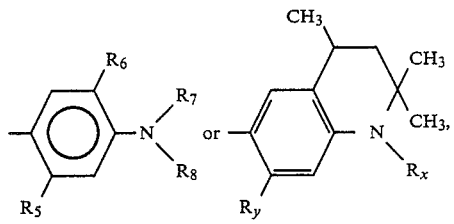

wherein $R_5$ is hydrogen; $C_{1-2}$alkyl; $C_{1-2}$alkoxy; cyano; formamido; ($C_{1-4}$alkyl)carbonylamino; ($C_{1-4}$alkyl)-carbonylamino the alkyl moiety of which is monosubstituted by hydroxy, chloro, bromo, $C_{1-4}$alkoxy, phenyl, phenoxy, benzloxy or ($C_{1-2}$alkoxy)-carbonyl; benzamido; acryloylamino; allylcarbonylamino; aminocarbonylamino; ($C_{1-4}$alkyl)aminocarbonylamino; ($C_{1-4}$alkoxy)carbonylamino; ($C_{1-4}$alkoxy)carbonylamino the alkoxy moiety of which is monosubstituted by $C_{1-2}$alkoxy or phenyl; $C_{1-2}$alkylsulfonylamino; phenylsulfonylamino; di-($C_{1-2}$alkyl)aminosulfonylamino; chloro or bromo, $R_6$ is hydrogen, chloro, bromo, $C_{1-2}$alkyl, $C_{1-2}$alkoxy or ($C_{1-2}$alkoxy)ethoxy, with the proviso that not more than one of $R_5$ and $R_6$ is chloro or bromo, $R_7$ is hydrogen; $C_{1-8}$alkyl; $C_{1-4}$alkyl substituted by 1 or 2 substituents each of which is independently chloro, bromo, hydroxy, thiocyano, cyano, ($C_{1-4}$alkyl)carbonyl, ($C_{1-4}$alkoxy)carbonyl, formyloxy, ($C_{1-10}$alkyl)carbonyloxy, cyclohexyl, ($C_{1-3}$chloroalkyl)carbonyloxy, ($C_{1-3}$bromoalkyl)carbonyloxy, ($C_{1-10}$alkoxy)carbonyloxy, ($C_{1-2}$alkoxy)ethoxycarbonyloxy, ($C_{3-4}$alkenyl)oxycarbonyl, chloroallyloxycarbonyl, bromoallyloxycarbonyl, $C_{3-4}$alkenyloxy, chloroallyloxy, bromoallyloxy, propynyloxy, benzoyloxy, $C_{1-4}$alkoxy, phenyl, phenoxy or phenyl($C_{1-4}$alkoxy), with the proviso that not more than one substituent is a member of the group consisting of benzoyloxy, phenyl, phenoxy and and phenyl($C_{1-4}$alkoxy); ($C_{1-4}$alkoxy)$C_{1-4}$alkyl the alkoxy moiety of which is monosubstituted by chloro, bromo, cyano, $C_{1-4}$alkoxy, ($C_{1-4}$alkoxy)carbonyl, ($C_{1-4}$alkoxy)carbonyloxy or ($C_{1-4}$alkyl)carbonyloxy; $C_{3-4}$alkenyl; $C_{3-4}$alkenyl monosubstituted by phenyl, chloro or bromo; propynyl; $C_{5-7}$cycloalkyl; cyclohexyl substituted by 1, 2 or 3 methyl groups; phenyl or phenyl substituted by 1, 2 or 3 substituents each of which is independently chloro, bromo, methyl or $C_{1-2}$alkoxy, $R_8$ is hydrogen; $C_{1-8}$alkyl; $C_{1-4}$alkyl monosubstituted by chloro, bromo, hydroxy, cyano, thiocyano, ($C_{1-4}$alkyl)carbonyl, ($C_{1-4}$alkoxy)carbonyl, formyloxy, ($C_{1-4}$alkyl)carbonyloxy, ($C_{1-4}$chloroalkyl)carbonyloxy, ($C_{1-4}$bromoalkyl)carbonyloxy, ($C_{1-4}$alkoxy)carbonyloxy, ($C_{1-2}$alkoxy)ethoxycarbonyloxy, ($C_{3-4}$alkenyl)oxycarbonyl, chloroallyloxycarbonyl, bromoallyloxycarbonyl, $C_{3-4}$alkenyloxy, chloroallyloxy, bromoallyloxy, propynyloxy, benzoyloxy, $C_{1-4}$alkoxy, phenyl, phenoxy, phenyl($C_{1-4}$alkoxy), carbamoyl, ($C_{1-4}$alkyl)carbamoyl, di-($C_{1-4}$alkyl)carbamoyl, ($C_{1-4}$alkyl)carbamoyloxy, di-($C_{1-4}$alkyl)carbamoyloxy, phenylcarbamoyl, phenylcarbamoyloxy, phthalimidyl-2, succinimidyl-2, saccharinyl-2, pyridyl or benzothiazolyl-2-mercapto; ($C_{1-4}$alkoxy)$C_{1-4}$alkyl the alkoxy moiety of which is monosubstituted by chloro, bromo, cyano, C$_{1-4}$alkoxy, (C$_{1-4}$alkoxy)carbonyl, (C$_{1-4}$alkoxy)carbonyloxy or (C$_{1-4}$alkyl)carbonyloxy; 2-hydroxy, (C$_{1-4}$alkyl)carbonyloxy or (C$_{3-4}$alkenyl)carbonyloxy-3-allyloxypropyl; 2-hydroxy, (C$_{1-4}$alkyl)carbonyloxy or (C$_{3-4}$alkenyl)carbonyloxy-3-propynyloxypropyl; C$_{3-4}$alkenyl or C$_{3-4}$alkenyl monosubstituted by chloro, bromo or phenyl, or R$_7$ and R$_8$ taken together and with the nitrogen atom to which they are joined are piperidino or morpholino, R$_x$ is hydroxyethyl, methyl, ethyl, methoxycarbonylethyl, ethoxycarbonylethyl, benzyl, methoxyethyl, ethoxyethyl or acetoxyethyl, and R$_y$ is hydrogen, methyl or acetamido, R is —CHO, —CH═C(CN)—R$_1$, —CH═CH—R$_2$, —CH═C(NO$_2$)—R$_3$, —CH═NOH or —CN, wherein R$_1$ is (C$_{1-10}$alkoxy)carbonyl; (C$_{1-10}$alkoxy)carbonyl monosubstituted by chloro, bromo, cyano, hydroxy, C$_{1-2}$alkoxy, (C$_{1-2}$alkyl)carbonyloxy or (C$_{1-2}$alkoxy)carbonyl; (C$_{1-10}$alkoxy)carbonyl disubstituted by hydroxy and by chloro or bromo; (C$_{3-8}$alkenyl)oxycarbonyl; (C$_{3-8}$chloroalkenyl)oxycarbonyl; (C$_{3-8}$bromoalkenyl)oxycarbonyl; propynyloxycarbonyl; benzyloxycarbonyl; chlorobenzyloxycarbonyl; nitrobenzyloxycarbonyl; C$_{1-4}$alkylsulfonyl; phenylsulfonyl; tolylsulfonyl; carbamoyl; (C$_{1-2}$alkyl)carbamoyl; di-(C$_{1-2}$alkyl)carbamoyl; phenylcarbamoyl; aminothiocarbonyl; benzimidazolyl-2; cyano; acetyl; phenyl; benzoyl or phenyl or benzoyl substituted by 1, 2 or 3 substituents each of which is independently chloro, bromo or nitro, with the proviso that the maximum number of nitro groups is two, and R$_2$ is phenyl; benzoyl or phenyl or benzoyl substituted by 1, 2 or 3 substituents each of which is independently chloro, bromo or nitro, with the proviso that the maximum number of nitro groups is two, and R$_3$ is hydrogen, methyl or ethyl, and m is 0 or 1, with the provisos that (i) when R is —CN, m must be 1, and (ii) the molecule is free of $$-\overset{|}{N}-\overset{|}{\underset{|}{C}}-O- \text{ and } -O-\overset{|}{\underset{|}{C}}-O-$$

radicals.

2. A compound according to claim 1 having the formula

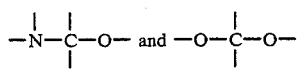

wherein
K is

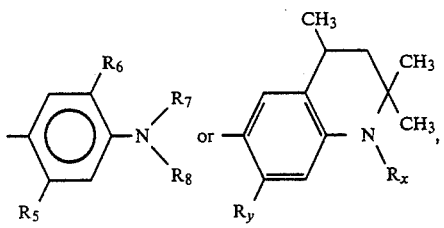

wherein

R$_5$ is hydrogen; C$_{1-2}$alkyl; C$_{1-2}$alkoxy; cyano; formamido; (C$_{1-4}$alkyl)carbonylamino; (C$_{1-4}$alkyl)carbonylamino the alkyl moiety of which is monosubstituted by hydroxy, chloro, bromo, C$_{1-4}$alkoxy, phenyl, phenoxy, benzyloxy or (C$_{1-2}$alkoxy)carbonyl; benzamido; acryloylamino; allylcarbonylamino; aminocarbonylamino; (C$_{1-4}$alkyl)aminocarbonylamino; (C$_{1-4}$alkoxy)carbonylamino; (C$_{1-4}$alkoxy)carbonylamino the alkoxy moiety of which is monosubstituted by C$_{1-2}$alkoxy or phenyl; C$_{1-2}$alkylsulfonylamino; phenylsulfonylamino; di-(C$_{1-2}$alkyl)aminosulfonylamino; chloro or bromo, R$_6$ is hydrogen, chloro, bromo, C$_{1-2}$alkyl, C$_{1-2}$alkoxy or (C$_{1-2}$alkoxy)ethoxy, with the proviso that not more than one of R$_5$ and R$_6$ is chloro or bromo, R$_7$ is hydrogen; C$_{1-8}$alkyl; C$_{1-4}$alkyl substituted by 1 or 2 substituents each of which is independently chloro, bromo, hydroxy, thiocyano, cyano, (C$_{1-4}$alkyl)carbonyl, (C$_{1-4}$alkoxy)carbonyl, formyloxy, (C$_{1-10}$alkyl)carbonyloxy, cyclohexyl, (C$_{1-3}$chloroalkyl)carbonyloxy, (C$_{1-3}$bromoalkyl)carbonyloxy, (C$_{1-10}$alkoxy)carbonyloxy, (C$_{1-2}$alkoxy)ethoxycarbonyloxy, (C$_{3-4}$alkenyl)oxycarbonyl, chloroallyloxycarbonyl, bromoallyloxycarbonyl, C$_{3-4}$alkenyloxy, chloroallyloxy, bromoallyloxy, propynyloxy, benzoyloxy, C$_{1-4}$alkoxy, phenyl, phenoxy or phenyl(C$_{1-4}$alkoxy), with the proviso that not more than one substituent is a member of the group consisting of benzoyloxy, phenyl, phenoxy and and phenyl(C$_{1-4}$alkoxy); (C$_{1-4}$alkoxy)C$_{1-4}$alkyl the alkoxy moiety of which is monosubstituted by chloro, bromo, cyano, C$_{1-4}$alkoxy, (C$_{1-4}$alkoxy)carbonyl, (C$_{1-4}$alkoxy)carbonyloxy or (C$_{1-4}$alkyl)carbonyloxy; C$_{3-4}$alkenyl; C$_{3-4}$alkenyl monosubstituted by phenyl, chloro or bromo; propynyl; C$_{5-7}$cycloalkyl; cyclohexyl substituted by 1, 2 or 3 methyl groups; phenyl or phenyl substituted by 1, 2 or 3 substituents each of which is independently chloro, bromo, methyl or C$_{1-2}$alkoxy, R$_8$ is hydrogen; C$_{1-8}$alkyl; C$_{1-4}$alkyl monosubstituted by chloro, bromo, hydroxy, cyano, thiocyano, (C$_{1-4}$alkyl)carbonyl, (C$_{1-4}$alkoxy)carbonyl, formyloxy, (C$_{1-4}$alkyl)carbonyloxy, (C$_{1-4}$chloroalkyl)carbonyloxy, (C$_{1-4}$bromoalkyl)carbonyloxy, (C$_{1-4}$alkoxy)carbonyloxy, (C$_{1-2}$alkoxy)ethoxycarbonyloxy, (C$_{3-4}$alkenyl)oxycarbonyl, chloroallyloxycarbonyl, bromoallyloxycarbonyl, C$_{3-4}$alkenyloxy, chloroallyloxy, bromoallyloxy, propynyloxy, benzoyloxy, C$_{1-4}$alkoxy, phenyl, phenoxy, phenyl(C$_{1-4}$alkoxy), carbamoyl, (C$_{1-4}$alkyl)carbamoyl, di-(C$_{1-4}$alkyl)carbamoyl, (C$_{1-4}$alkyl)carbamoyloxy, di-(C$_{1-4}$alkyl)carbamoyloxy, phenylcarbamoyl, phenylcarbamoyloxy, phthalimidyl-2, succinimidyl-2, saccharinyl-2, pyridyl or benzothiazolyl-2-mercapto; (C$_{1-4}$alkoxy)C$_{1-4}$alkyl the alkoxy moiety of which is monosubstituted by chloro, bromo, cyano, $C_{1-4}$alkoxy, ($C_{1-4}$alkoxy)carbonyl, ($C_{1-4}$alkyl)carbonyloxy or ($C_{1-4}$alkyl)carbonyloxy; 2-hydroxy, ($C_{1-4}$alkyl)carbonyloxy or ($C_{3-4}$alkenyl)carbonyloxy-3-allyloxypropyl; 2-hydroxy, ($C_{1-4}$alkyl)carbonyloxy or ($C_{3-4}$alkenyl)carbonyloxy-3-propynyloxypropyl; $C_{3-4}$alkenyl or $C_{3-4}$alkenyl monosubstituted by chloro, bromo or phenyl, or $R_7$ and $R_8$ taken together and with the nitrogen atom to which they are joined are piperidino or morpholino, $R_x$ is hydroxyethyl, methyl, ethyl, methoxycarbonylethyl, ethoxycarbonylethyl, benzyl, methoxyethyl, ethoxyethyl or acetoxyethyl, and $R_y$ is hydrogen, methyl or acetamido, R is —CHO, —CH=C(CN)—$R_1$, —CH=C—$R_2$, —CH=C(NO$_2$)—$R_3$, —CH=NOH or —CN, wherein $R_1$ is ($C_{1-10}$alkoxy)carbonyl; ($C_{1-10}$alkoxy)carbonyl monosubstituted by chloro, bromo, cyano, hydroxy, $C_{1-2}$alkoxy, ($C_{1-2}$alkyl)carbonyloxy or ($C_{1-2}$alkoxy)carbonyl; ($C_{1-10}$alkoxy)carbonyl disubstituted by hydroxy and by chloro or bromo; ($C_{3-8}$alkenyl)oxycarbonyl; ($C_{3-8}$chloroalkenyl)oxycarbonyl; ($C_{3-8}$bromoalkenyl)oxycarbonyl; propynyloxycarbonyl; benzyloxycarbonyl; chlorobenzyloxycarbonyl; nitrobenzyloxycarbonyl; $C_{1-4}$alkylsulfonyl; phenylsulfonyl; tolylsulfonyl; carbamoyl; ($C_{1-2}$alkyl)carbamoyl; di-($C_{1-2}$alkyl)carbamoyl; phenylcarbamoyl; aminothiocarbonyl; benzimidazolyl-2; cyano; acetyl; phenyl; benzoyl or phenyl or benzoyl substituted by 1, 2 or 3 substituents each of which is independently chloro, bromo or nitro, with the proviso that the maximum number of nitro groups is two, and $R_2$ is phenyl; benzoyl or phenyl or benzoyl substituted by 1, 2 or 3 substituents each of which is independently chloro, bromo or nitro, with the proviso that the maximum number of nitro groups is two, and $R_3$ is hydrogen, methyl or ethyl, and m is 0 or 1, with the provisos that (i) when R is —CN, m must be 1, and (ii) the molecule is free of

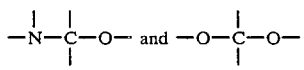

radicals.

3. A compound according to claim 2 wherein R is —CHO, —CH=C(CN)—$R_1$, —C=CH—$R_2$, —CH=C(NO$_2$)—$R_3$ or —CH=NOH.

4. A compound according to claim 3 wherein m is 0.

5. A compound according to claim 4 wherein R is —CHO.

6. A compound according to claim 3 wherein R is —CHO, —CH=C(CN)—$R_1$ or —CH=C(NO$_2$)—$R_3$.

7. A compound according to claim 3 wherein $R_1$ is ($C_{3-6}$alkoxy)carbonyl or ($C_{3-6}$alkenyl)oxycarbonyl, and $R_3$ is hydrogen.

8. A compound according to claim 7 wherein

R is —CHO, —CH=C(CN)—$R_1'$ or —CH=CH—NO$_2$, wherein $R_1'$ is ($C_{3-6}$alkoxy)carbonyl or ($C_{3-6}$alkenyl)oxycarbonyl.

9. A compound according to claim 8 wherein

R is —CHO or —CH=C(CN)—$R_1'$, wherein $R_1'$ is ($C_{3-6}$alkoxy)carbonyl or ($C_{3-6}$alkenyl)oxycarbonyl.

10. A compound according to claim 7 wherein K is

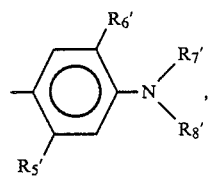

wherein $R_5'$ is hydrogen, methyl or —NH—CO—$R_9$, wherein $R_9$ is hydrogen, $C_{1-4}$alkoxy, ($C_{1-2}$alkoxy)ethoxy, $C_{1-2}$alkyl or $C_{1-2}$alkyl monosubstituted by chloro, bromo or $C_{1-2}$alkoxy, $R_6'$ is hydrogen, methyl, methoxy, ethoxy or ($C_{1-2}$alkoxy)ethoxy, $R_7'$ is hydrogen; $C_{3-4}$alkenyl; $C_{1-6}$alkyl; $C_{2-3}$alkyl monosubstituted by hydroxy, allyloxy, propynyloxy, cyano, ($C_{1-4}$alkoxy)carbonyl or ($C_{3-4}$alkenyl)oxycarbonyl or $C_{2-3}$alkyl substituted by 1 or 2 substituents each of which is independently $C_{1-3}$alkoxy, ($C_{1-3}$alkyl)carbonyloxy or ($C_{1-3}$alkoxy)carbonyloxy, and $R_8'$ is $C_{1-4}$alkyl, benzyl, phenylethyl or $C_{2-3}$alkyl monosubstituted by hydroxy, $C_{1-3}$alkoxy, allyloxy, propynyloxy, cyano, ($C_{1-3}$alkyl)carbonyloxy, ($C_{1-4}$alkoxy)carbonyl, ($C_{3-4}$alkenyl)oxycarbonyl, ($C_{1-3}$alkoxy)carbonyloxy or phenoxy.

11. A compound according to claim 10 wherein $R_5'$ is hydrogen or methyl, and $R_6'$ is hydrogen.

12. A compound according to claim 11 wherein $R_7'$ is ethyl, and $R_8'$ is ethyl.

13. A compound according to claim 3 wherein K is

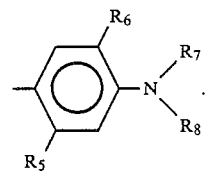

14. A compound according to claim 13 wherein m is 0.

15. A compound according to claim 13 wherein R is —CHO, —CH=C(CN)—$R_1$ or —CH=C(NO$_2$)—$R_3$.

16. A compound according to claim 15 wherein m is 0.

17. A disperse dye of the formula

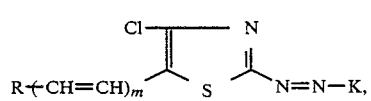

wherein

K is the radical of a coupling component of the aniline, α-naphthylamine, pyrazlone, aminopyrazole, indole, tetrahydroquinoline, thiazole, phenol, napthol, pyridine or pyridone series, R is —CHO, —CH=C(CN)—$R_1$, —CH=CH—$R_2$, —CH=C($NO_2$)—$R_3$, —CH=NOH or —CN, wherein $R_1$ is ($C_{1-10}$alkoxy)carbonyl; ($C_{1-10}$alkoxy)carbonyl monosubstituted by chloro, bromo, cyano, hydroxy, $C_{1-2}$alkoxy, ($C_{1-2}$alkyl)carbonyloxy or ($C_{1-2}$alkoxy)carbonyl; ($C_{1-10}$alkoxy)carbonyl disubstituted by hydroxy and by chloro or bromo; ($C_{3-8}$alkenyl)oxycarbonyl; ($C_{3-8}$chloroalkenyl)oxycarbonyl; ($C_{3-8}$bromoalkenyl)oxycarbonyl; propynyloxycarbonyl; benzyloxycarbonyl; chlorobenzyloxycarbonyl; nitrobenzyloxycarbonyl; $C_{1-4}$alkylsulfonyl; phenylsulfonyl; tolylsulfonyl; carbamoyl; ($C_{1-2}$alkyl)carbamoyl; di-($C_{1-2}$alkyl)carbamoyl; phenylcarbamoyl; aminothiocarbonyl; benzimidazolyl-2; cyano; acetyl; phenyl; benzoyl or phenyl or benzoyl substituted by 1, 2 or 3 substituents each of which is independently chloro, bromo or nitro, with the proviso that the maximum number of nitro grups is two, and $R_2$ is phenyl; benzoyl or phenyl or benzoyl substituted by 1, 2 or 3 substituents each of which is independently chloro, bromo or nitro, with the proviso that the maximum number of nitro groups is two, and $R_3$ is hydrogen, methyl or ethyl, and m is 0 or 1, with the provisos that (i) when R is —CN, m must be 1, and (ii) the molecule is free of

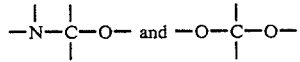

radicals.

* * * * *